Figure 1:
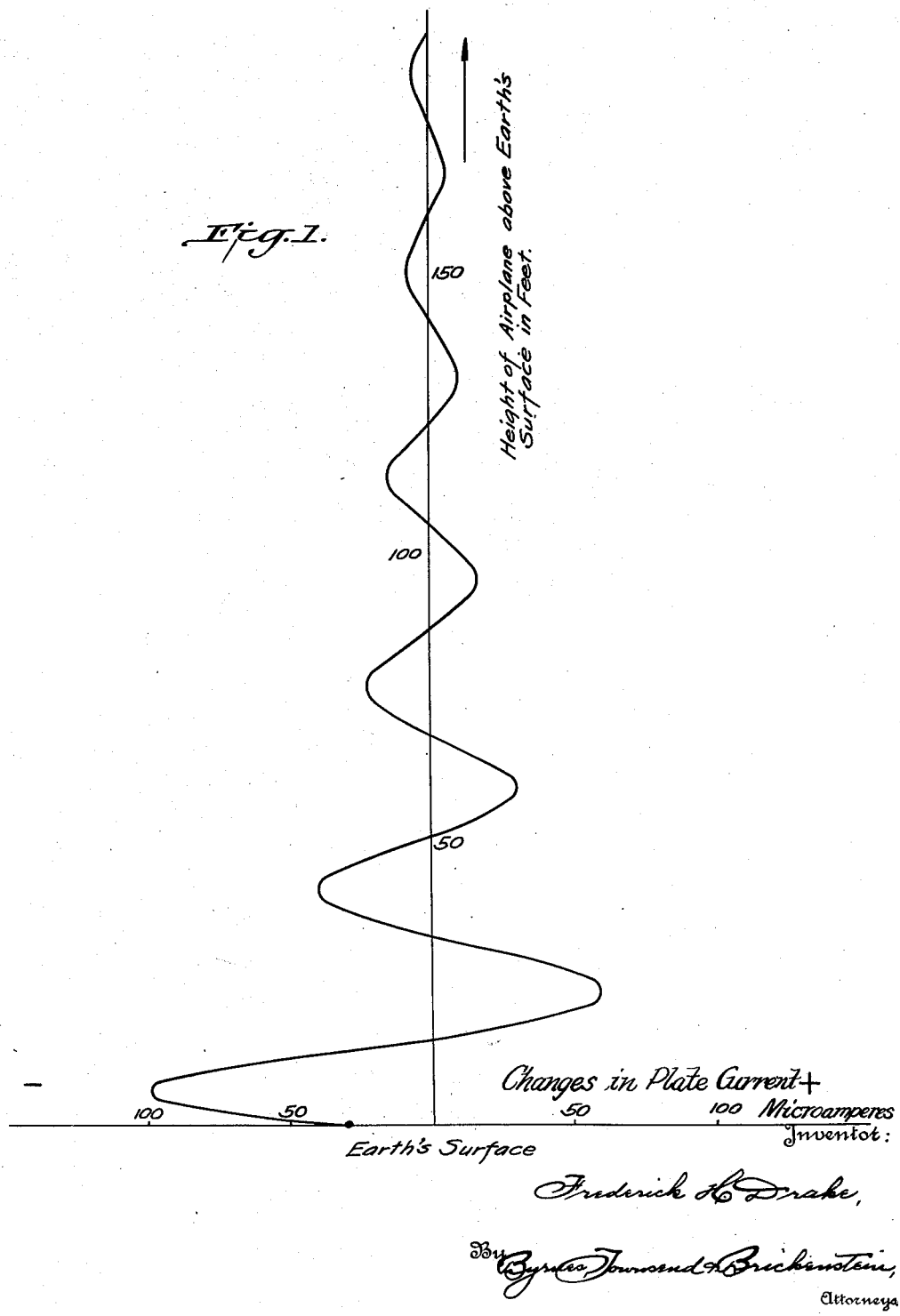

Jan. 8, 1935. F. H. DRAKE 1,987,587
ELECTRICAL DEVICE AND METHOD OF DETERMINING DISTANCES
Filed Jan. 16, 1928 4 Sheets-Sheet 2

Jan. 8, 1935.  F. H. DRAKE  1,987,587
ELECTRICAL DEVICE AND METHOD OF DETERMINING DISTANCES
Filed Jan. 16, 1928  4 Sheets-Sheet 3

Inventor:
Frederick H. Drake,
By Byrnes Townsend & Brickenstein,
Attorneys

Jan. 8, 1935.  F. H. DRAKE  1,987,587
ELECTRICAL DEVICE AND METHOD OF DETERMINING DISTANCES
Filed Jan. 16, 1928    4 Sheets-Sheet 4

*Fig. 5*

*Fig. 6*

INVENTOR
FREDRICK H. DRAKE
BY
ATTORNEY

UNITED STATES PATENT OFFICE 1,987,587

ELECTRICAL DEVICE AND METHOD OF DETERMINING DISTANCES

Frederick H. Drake, Boonton, N. J., assignor, by mesne assignments, to Radio Corporation of America, New York, N. Y., a corporation of Delaware Application January 16, 1928, Serial No. 247,190

24 Claims. (Cl. 250—1)

This invention relates to an electrical device and method for determining distances between an observer or indicating means and a reflecting surface for electric waves. It relates more particularly to such a device and method for determining distances by the use of electric waves of radio frequency. The invention relates, for example, to an electrical device and method for use or association with flying devices of various types, such as aeroplanes, flying machines, hydroaeroplanes, gliders, balloons, dirigibles, helicopters, and the like, and furnishes a means for indicating the proximity of such devices to the earth's surface, or to other reflecting objects, and for determining the altitude of such devices above the earth's surface. My invention may be applied, in general, to determining the distance between an observer and any reflecting surface for electric waves, and is therefore applicable not only to devices which operate above the surface of land or water, but is also applicable to such devices as submarines, which operate below the surface of water, in which case the junction of air and water serves as a reflecting surface which may be employed according to my invention to indicate the depth of the submarine or other submersible objects below the surface of the water.

The foregoing illustrations are given merely as examples of applications of my invention which I shall hereafter describe more particularly in connection with flying devices hereafter referred to, for the sake of simplicity, simply as an "areoplane" or "plane".

As examples of certain needs and uses for my invention I may mention the following: In the case of an aeroplane approaching the earth (either land or sea) it is desirable to have a device for indicating the height of the plane above the earth; in fact an accurate indicating means is often essential if disaster is to be avoided at night, or in case of fog, clouds, and so forth. Particularly is it desirable for an aviator flying low to have an accurate means of determining when he is dangerously close to objects on the earth (for example trees and buildings), and to know the correct height at which to change his direction to horizontal when landing. While aneroid barometers may be in general sufficiently accurate for the purpose of determining height when flying high, they are practically useless in establishing accurately small differences in height near the earth, because of variable atmospheric pressure and insufficient sensitivity. The device and method for determining altitude or other distances, according to my invention, afford a means of overcoming the shortcomings and inherent limitations of aneroid altimeters, and give far more exact knowledge of height above the earth than has been hitherto obtainable, accomplishing this even when the height above the earth is relatively low, as when making a landing.

I am aware that hitherto efforts have been made to apply electrical means to the indication of the height of flying machines above the earth. So far as I am aware, such attempts have involved the use of electrical circuits including variable capacity between the earth and the flying machine, and employing the detuning effect of variations in this capacity according to the height of the flying machine. I have found however that this and similar methods are both unsatisfactory and limited in their application, owing partly to the fact that they can be employed effectively only at extremely low altitudes and in a limited range.

According to my invention radio energy in the form of electric waves is radiated through space (atmosphere or water) from a suitable source in such manner that a substantial portion of the radiated energy impinges on the surface or object whose presence near or distance from the source it is desired to ascertain. Of this electric wave energy impinging upon the surface or object just mentioned, a certain amount will be reflected back toward the radiator, and in my invention this reflected portion is analyzed in respect to phase and amplitude by suitable devices. For example, the reflected energy will react with the transmitted energy so as to form in space an interference pattern which may be utilized to give desired information concerning the distance of the radiator from the reflecting surface. As will appear from the following description a variety of surfaces operate to produce a suitable reflection of the radio waves. As an example of the application of my invention, radio energy in the form of electric waves may be transmitted from an aeroplane and reflected from the earth's surface, whether land or water, to form the desired reflected energy for analysis by devices on the plane; or conversely, the electric waves may be radiated from a transmitting device located on the earth's surface, whether on land or water, and reflected from an aeroplane to form the desired reflected energy. In any case the reflected energy established by the object or surface in question is utilized as hereinafter described to indicate the distance between the radiating source and the reflecting surface, or to indicate the proximity of an unknown or unexpected reflecting surface to the radiating source. Although certain electrostatic or inductive effects between the reflecting surface, for example, the earth, and the radiator, for example, a transmitting device on an aeroplane, may exist, I have found that these effects may usually be disregarded in the application of my invention, because of the fact that they are in general insignificant as compared with the electric wave phenomena which are utilized according to my invention. As another example of the application of my invention, a source of radiation, such as an antenna or the like, may be carried on a submersible device or submarine, and electrical waves radiated from this device may be caused to be reflected from the surface of the water back to the submerged source, forming in the water an interference pattern which is utilized as hereinafter described, in order to determine the distance between the submerged radiating source and the surface of the water.

Figure 2:
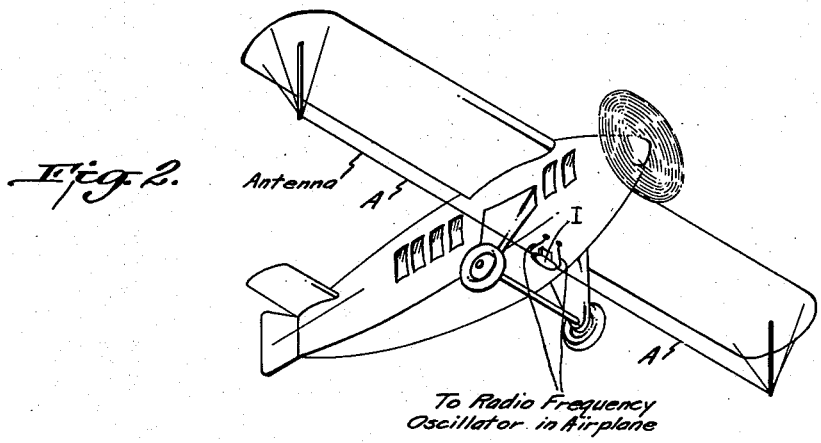
Figure 3:
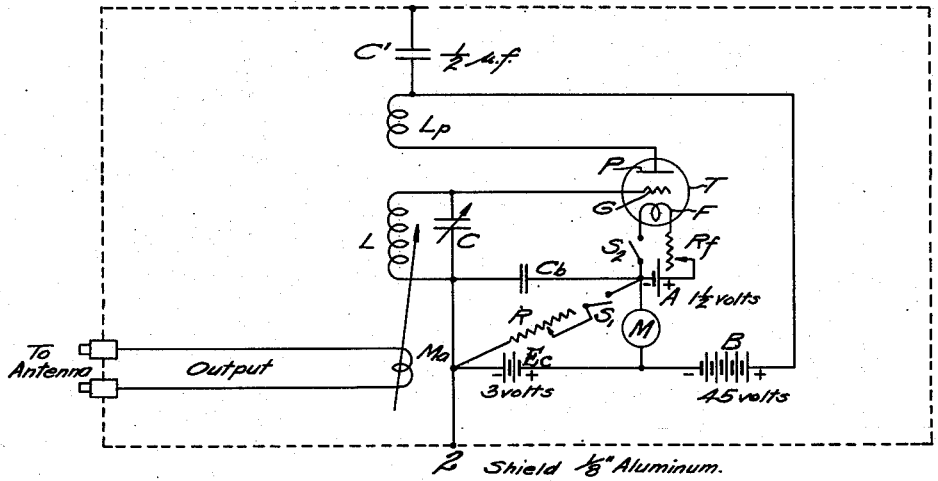
Figure 4:
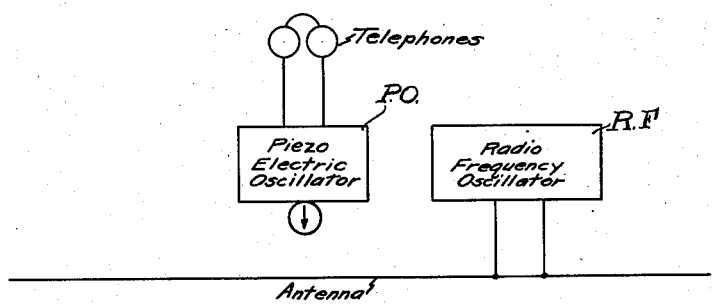

Referring now to the drawings, Fig. 1 is a diagram illustrative of the results obtained by one suitable method of analysis of the phase and amplitude of the reflected waves according to the principle of my invention; Fig. 2 illustrates an embodiment of my invention, as applied to an aeroplane; Fig. 3 is a circuit diagram of one form of oscillator circuit which I have found suitable for use according to my invention; Fig. 4 illustrates, in part, an alternative form of indicating means according to my invention; while Figures 5 and 6 are modifications of the arrangement shown in Figure 3.

In order to illustrate the principle of my invention, let us consider the case of a radio frequency oscillator coupled to an antenna which is stretched along the wing of a plane flying above the earth; and let us suppose further that there is a suitable indicating instrument or circuit on the plane which is affected by small changes in the antenna current. The antenna radiates energy, in the form of electric waves, to the earth and of this wave energy a certain fractional part is reflected back toward the plane and produces in the antenna a voltage whose phase and amplitude depend, inter alia, upon the physical and electrical characteristics of the reflecting earth, and the height of the aeroplane antenna above the earth. The instrument on the plane, being affected by changes in antenna current, therefore records, as the plane approaches earth, a series of maxima and minima of increasing amplitude, as indicated in Figure 1. The increasing maxima and minima are due to the periodic change of phase and increase in amplitude of the reflected energy with decreasing height above earth. That is, the length of path between the antenna and the effective reflecting surface on the earth introduces a retardation in phase for the reflected energy increment which, other things being constant, determines whether the reflected energy reinforces or weakens the normal antenna current, and in so doing provides an indication which may be used to determine the distance between antenna and earth. For example, if the earth were perfectly reflecting, (i. e. perfectly conducting) the oscillator-antenna system being properly adjusted, a strong maximum of antenna current would occur when the antenna was approximately half a wave length above earth, since in this case there would be a phase retardation of one wave length introduced in the reflected energy on its arrival at the antenna, and so the normal antenna current would be reinforced. If the height of antenna above perfectly conducting earth were one quarter wave length, the total phase lag would be half a wave length and so a minimum of antenna current would ensue. Similarly, if the height were a whole wave length, there would again be reinforcements, and a maximum of current, which, however, would be smaller than the one for a height of half a wave length because the amount of the reflected energy reaching the antenna would be less. Thus are explained the increasing maxima and minima with decreasing height above the earth, as shown in Fig. 1.

I have found that, in view of the rapid increase in magnitude of the indicator surges with approach to earth, a system can be arranged so as either to indicate the height above the earth according to the successive maxima and minima, or so as to "trigger off" (as by the action of a relay) a signal to the operator at a given height above earth, corresponding, say, to the first strong maximum or strong minimum, as shown in Fig. 1. By choosing the proper wave length for the oscillator a signal corresponding to the first (strong) maximum may be triggered off at any desired height, within certain limits imposed by the maximum length of antenna that can be strung on the particular plane or other object in question. For example, a plane with a 50 foot wing spread can accommodate an antenna operable efficiently at a wave length of approximately 30 meters or at certain lower wave lengths. Over perfectly conducting earth this plane would then find a strong maximum when the antenna was approximately fifteen meters above earth. By changing the wave length, and by working on other maxima (or minima), a signal can be triggered off at a greater or lesser height, as desired.

During the foregoing discussion it has been assumed that the earth is perfectly conducting and hence perfectly reflecting. This assumption may of course be practically fulfilled at a landing field or other desired locality by laying conducting netting, screening, wires, plates, or the like, just under the ground, and is also substantially fulfilled over salt water. But I have found that it is not necessary, in actual practice, to make the earth thus conducting, since for any conductivity of earth, or for water whether salt or fresh, a calibration of the height at which reaction maxima and minima occur is readily made, and permits determination of height in accord with the principles described above. The effect of imperfect conductivity in the reflecting surface is merely to modify and displace the fundamental indicating-instrument curve of Figure 1. By proper calibration of the instrument, according to well known principles of instrument manufacture, the instrument can be made to record the height directly, even when the earth surface is not perfectly conducting. As the plane approaches the earth increasing maxima and minima result, and the positions of these points of maximum reaction are used to indicate the height of the plane above the earth.

In the case of a larger lighter-than-air craft, such as the large dirigibles or Zeppelins now frequently employed, an antenna 600 feet long may be strung. This permits efficient use of a wave length of about 400 meters, making a point of strong maximum at approximately 600 feet above the earth's surface. The invention may be used in this case to maintain accurately the height above earth during flight.

Again, when an air craft is flying low in fog over trees and buildings, irregular reflections from these objects cause fluctuations in the indicating instrument which serve as a warning to the pilot.

Many other applications of and uses for the hereindescribed device as embodied in radio altimeters will be obvious to those familiar with aeronautics, and especially to persons engaged in long-distance, trans-oceanic, passenger, and mail service flying. The foregoing examples of uses of the invention hereindescribed are merely illustrative of its many uses and applications.

In order to illustrate the operation of a converse application of my invention, let us consider the case of a radio oscillator or series of oscillators located on the earth's surface, whether land or shipboard, suitably coupled to an antenna system, and provided with a suitable meter, or other indicating device associated with the oscillator-antenna system so as to indicate changes in the antenna current. Then suppose that a plane is suitably equipped to reflect in appreciable amount the radiation emitted by the transmitter on the earth's surface. The approach of the plane to the antenna system then occasions changes in the readings of the indicating meter, which changes are interpreted by proper calibration of the instrument to indicate the distance between the plane and the transmitter. With regard to this application of my invention an all-metal aeroplane may be sufficiently reflecting, due to its all-metal construction, to produce reactions in the oscillators located on the earth's surface, thus causing fluctuations of the indicating instruments; or in case an aeroplane is not of the all-metal type it may have sufficient metal struts, guys, or the like, to provide the required reflection. An alternative method of providing this reflection from the aeroplane is to arrange a wire below and parallel to the wings, and of such length as to be resonant to the transmitted energy.

This application of my invention is suitably utilized in the case of landing fields, for example where night landing is frequent as in the case of mail service, or in the case of ship aeroplane carriers, similar to those now frequently employed in naval service.

In carrying out this application of my invention a suitable arrangement is to connect the oscillators supplying radiated energy from the earth's surface in association with electrical relays which are closed by means of a reaction maxima or minima occurring when the aeroplane reaches the desired height above the earth's surface. The electrical relay thus operated may light a suitable warning light on the ground or actuate any other device adapted to advise the pilot of his proximity to earth, or of his exact height above earth.

Figure 2 is a diagrammatic illustration of one physical embodiment of my invention. A radio frequency oscillator located in an aeroplane is suitably coupled to an antenna A, which may be stretched, for example, on suitable supports below the wings of the plane. The antenna may be divided by means of an insulator, I, and the two portions connected to the radio frequency oscillator at their inner ends through the feeder wires, as indicated.

Figure 3 is a circuit diagram of one form of radio frequency oscillator which I have found suitable for use according to my invention, and includes also coupling means for use between the antenna and the oscillator, and a suitable instrument for indicating maxima and minima of antenna current. An oscillator circuit of this type may be especially adapted for the generation of relatively high frequency radio oscillations. The circuit comprises a vacuum tube T (for example, a WX 12 Radiotron) provided with an anode or plate P, at least one control electrode or grid G, and a cathode or a filament F. A tuned oscillatory circuit is provided by the inductance, L, connected between the grid and the filament leads, and tuned by the variable condenser, C. The grid return to the cathode is through the biasing battery-$E_c$ and adjustable resistance R (for example a 2000 ohm potentiometer), shunted by by-pass condenser $C_b$. The filament may be heated by a battery, A and a filament rheostat, $R_f$ may be included in the heating circuit. The plate circuit is completed through the feed-back coil $L_p$, coupled to the coil L, the sensitive direct current indicating meter M, and the B-battery. The oscillator may suitably be enclosed within a shield, as indicated by the dotted lines. This shield may be of copper, aluminum, or the like, and the coil $L_p$ or other suitable portion of this oscillator circuit may be grounded to this shield through a condenser, for example that shown at $C'$, which is suitably of the order of ½ microfarad. The circuit may also be grounded to the shield as indicated at 2. Switches $S_1$ and $S_2$ may be included in the oscillator circuit as indicated. The indicating meter M is connected in the lead to the filament which is common to both the grid and the plate circuit. The antenna is coupled through the adjustable inductive coupling $M_a$ to the oscillating circuit, as shown. The variable resistance R, together with the battery C, serve to oppose the relatively large normal or steady plate current of the oscillator flowing through the indicating meter M, so as to reduce this current to a small or substantially zero value when the reflecting surface is far removed from the oscillator, i. e. when only a negligible amount of energy is reflected back to the oscillator. The battery-C thus serves the two-fold purpose of a biasing battery and of an adjusting battery for the indicating instrument M. When however the radiating oscillator and the reflecting surface approach one another the reflected energy modifies the plate current, in the manner heretofore explained, and the meter M shows increasing positive and negative surges, of maxima or minima, which may be either used directly or by suitable calibration of the meter to indicate the distance between the radiating oscillator and the reflecting surface.

According to another embodiment of my invention the indicating instrument M. together with a suitable adjusting battery 10 and variable resistance R, may be connected in the direct current grid circuit of the tube T as shown in Figure 5. This circuit except for the features mentioned hereinbefore and for the blocking condenser $C_b$ and the radio frequency choke connected as shown may be the same as that shown in Figure 4. Another suitable indicating means, as an alternative to the meter M, is a radio frequency thermocouple instrument or meter $M_{tc}$ which may be connected directly in the antenna circuit as shown in Figure 6 or in other suitable position, and which serves to indicate the fundamental phenomena of maxima and minima as heretofore described.

It should be understood that this invention comprises broadly a method of and means for the transmission of electrical wave radiation at radio frequency from a suitable source; its reflection from a suitable reflecting surface whose presence near, or whose distance from the source it is desired to know; and the analysis of the amplitude and/or phase phenomena of the reflected wave energy or of the interference pattern resulting therefrom by suitable devices, thereby obtaining information as to the presence of a reflecting surface or as to the distance between the reflecting surface and the transmitting source. The method of and means for analyzing the interference pattern by the production of a series of maxima and minima in an indicating meter in the oscillator circuit by allowing the reflected waves to react on the transmitter is merely one method of analysis. Although I have found this method satisfactory in actual use, my invention is not limited thereto, but includes other methods, such as the variations heretofore described, and also an arrangement including a separate receiver and separate antenna in which the voltage produced by the transmitter is balanced out. In such a system the readings given by the indicating instrument depend solely on the amplitude of the reflected energy, and the system therefore affords certain advantages for direct calibration.

According to another suitable arrangement pursuant to my invention a piezo-electric crystal-controlled oscillator, or other suitable oscillator so designed as to maintain a frequency which is constant within narrow limits, is employed to indicate the positions of maximum or minimum interference between the transmitted and the reflected electric waves, as shown in Fig. 4. A pair of telephone receivers are connected to the piezo-electric oscillator in suitable manner and indicate "beats" between the harmonics of the radio frequency oscillator R. F. and those of the piezo-electric oscillator P. O. If the relative frequencies of the two oscillators are so adjusted as to give "zero beat" when the plane is high above the earth, then as the plane approaches earth the frequency of the beat note periodically increases and decreases as the plane goes through maxima and minima of the interference pattern. From these changes in the beat note, and suitable calibration of the apparatus, the height of the plane above earth is determined. This audible indicator of the positions of maximum reaction in the antenna circuit produced by waves reflected from the earth is merely an alternative for, or a supplement to, the visual indicator represented at M in Figure 3. Both indicating means may be used simultaneously, or either one may be employed alone, as described.

As an illustration of the application of my invention in a radio altitude indicator for flying machines in flight, whether over imperfectly conducting earth, or fresh water (which is also an imperfect conductor) I will now describe a particular installation which I have employed in actual practice. Such an installation is suitable for use in either a bi-plane or monoplane having a wing spread of about 40 feet or more. The antenna consists of a single wire stretched below the lower wing of the plane, and parallel thereto, at right angles to the fusilage as shown in Fig. 2. The wing skids furnish suitable support for this wire. The length of the horizontal wire may suitably be about 35 feet and the antenna is interrupted at its mid-point, the two ends being held together by a strain insulator fastened to a bolt on the fusilage. This antenna wire should be stretched tightly in order to prevent variations in current due to mechanical oscillations when the plane is in flight. The antenna is excited through two feeder wires which are connected to the inner ends of the two segments of the antenna adjacent the central insulator "I" as indicated in Figure 2. These feeder wires are led into the body of the plane through a suitable insulator such as a fibre tube, and are connected to the output terminals of the oscillator, which may be of the type shown in Figure 3. According to this arrangement the direct current meter M of the circuit shown in Figure 3 is employed as an indicating means, being provided with a suitably calibrated scale. The oscillator may be adjusted to any one of a number of different wave lengths, and my invention includes not only excitation of the antenna at its fundamental frequency, but at its various harmonics, as may be desired. For example with the installation just described I obtain excellent results by the use of the third harmonic of the antenna, although I also successively employ the antenna fundamental. In the course of one particular test the antenna was excited at a wave length of approximately 11 meters (48 feet), which was its third harmonic, the exciting current being supplied by a small receiving tube arranged in the oscillator circuit of Figure 3. This arrangement gave quantitative indications of altitude above either dry earth or fresh water. When a standard Weston indicating meter is employed in this circuit at least 6 maxima and 6 minima are clearly marked, and the largest deflection of the instrument may correspond to approximately 100 microamperes change in plate current, or substantially full scale. This installation is therefore quantitatively accurate to a height of substantially 66 meters or 200 feet above the earth's surface. The curve of Fig. 1, previously referred to, in describing the principle of my invention, is taken from actual experimental data obtained with an installation similar to the one described. In this curve the height of the plane above the earth's surface is plotted on the vertical scale in feet, and the readings of the indicating meter M are plotted on the horizontal scale. The maxima and minima of the curve correspond to actual deflections of the indicating instruments, the scale being arranged with its zero point in the center so that the indicating needle may be deflected in either direction. The instrument pointer is brought to the zero line, when the plane is at such altitude that the effects of reflected wave energy are substantially zero, by adjusting the resistance R to balance out the normal plate current in the meter by an equal current from the grid battery C. Deflections to the right of the zero line represent the reinforcements of the plate current by the reflected waves, and deflections to the left of the zero line represent reductions of the plate current by the reflected waves. The peak values of the meter readings thus occur at altitudes spaced approximately 14 feet apart over the range from 200 feet to the earth's surface.

While I have here described certain specific embodiments, applications, examples and particular installations according to my invention, it should be understood that these are illustrative only, and that the invention is not limited thereto.

I claim:

1. The method of indicating the distance of a surface or objects from a source of electric waves which comprises constantly radiating said waves through space so that a substantial part of the wave energy impinges on said surface or objects, and observing the reactions produced on said source by waves reflected from said surface or objects, to indicate the distance between said source and surface or objects.

2. The method of indicating the proximity of a reflector of electric waves to a source of electric waves of radio frequency which comprises constantly radiating said waves through space, and measuring the effects of reflected wave energy upon said radio frequency source to indicate the nature of the interference pattern of the radiated wave and the wave from said reflector in proximity to said radiating source.

3. Method of determining the altitude of an aeroplane or the like above the earth's surface which comprises radiating electric waves of radio frequency from a suitable source on said aeroplane so that a substantial part of the radiated wave energy impinges on the earth's surface; and utilizing the reactions produced on said source by the waves reflected from the earth's surface to determine the altitude of the aeroplane above the earth's surface.

4. Method of determining the proximity of the earth's surface to an aeroplane or the like which comprises constantly radiating electric waves of radio frequency from a suitable source on said aeroplane so that a substantial part of the radiated wave energy impinges on the earth's surface; and utilizing the reactions produced on the source by waves reflected from the earth's surface to determine the proximity of the earth's surface to the aeroplane.

5. An electrical device for measuring distances comprising a radio frequency oscillator having sources of current supply for energizing the same, an ammeter in one of the circuits of said oscillator, and means including one of said sources of current supply for passing through said ammeter a balancing current equal and opposite to that normally established thereby by said oscillator, and a device for radiating into space electric waves generated by said oscillator, whereby the presence near said oscillator of a surface or object capable of reflecting electric waves will be indicated by a deflection of the ammeter pointer.

6. An electrical device for measuring distances comprising an electrical radio frequency oscillator circuit, generating waves of a substantially fixed frequency, a device for radiating into space electric waves generated by said oscillator circuit and for receiving said waves by reflection, and means for indicating the reactions upon said oscillator-radiator system of waves reflected back to said radiating device, whereby the distance traveled by said waves may be determined.

7. An electrical oscillator circuit for use in a device for measuring distances comprising a vacuum tube including at least an anode, a cathode and one control electrode; an oscillatory circuit connected between said cathode and control electrode; a coil connected to said anode and coupled to a coil in said oscillatory circuit; an indicating meter in a portion of said oscillator circuit common to the cathode-anode and the cathode-control electrode branches thereof; and means for substantially balancing out of said indicating meter the direct current flowing therethrough due to the normal current flowing in the anode-cathode circuit of said vacuum tube.

8. In a system for determining altitudes from aircraft by radio waves generated in a self-excited oscillation generator having an antenna coupled thereto, the method which includes radiating waves from said antenna toward the earth, receiving said waves upon said antenna after reflection from the earth, the frequency of the radiated waves being such that the phase relation existing between the radiated and received waves varies cyclically as the craft changes in altitude over the range in which the altitude is to be determined, producing an electric current upon the craft and causing said current to vary in intensity in accordance with the variations in phase relation between said radiated and reflected waves.

9. In a system for determining altitudes from aircraft by radio waves generated in a self-excited oscillation generator having an antenna coupled thereto, the method which includes radiating waves from said antenna toward the earth, receiving said waves upon said antenna after reflection from the earth, the frequency of the radiated waves being such that the phase relation existing between the radiated and received waves varies cyclically as the craft changes in altitude over the range in which altitudes are to be determined, producing an electric current upon the craft and causing said current cyclically to vary in intensity in accordance with the phase relation existing between the radiated and reflected waves the amplitude of said cyclic variation being dependent upon the intensity of the received waves and determining the altitude from the amplitude of the cyclic variation.

10. In a system for determining altitudes from aircraft, by radio waves generated in a self-excited oscillation generator, the method which includes radiating said waves toward the earth, impressing the radiated wave after reflection from the earth upon said generator whereby the reflected wave controls a characteristic of the radiated wave and whereby the phase relation between the radiated and reflected waves varies cyclically as the craft changes in altitude, and utilizing the cyclical variations in phase relation between said radiated and reflected waves to determine the altitude.

11. The combination, in an altimeter for aircraft, of an oscillation generator, a load circuit therefor, said load circuit comprising an antenna arranged to radiate oscillations from the craft toward the earth and to receive said oscillations after reflection from the earth toward the craft whereby said antenna constitutes a variable load on said generator, said generator producing oscillations the intensity of which is dependent upon said variable load on said generator and current indicating means responsive to the intensity of oscillations produced by said generator, for indicating the altitude of said aircraft.

12. The combination, in an altimeter for aircraft, of a source of radio frequency oscillations, said source being unstable with respect to variations in load whereby the intensity of oscillations produced varies in response to variations of said load, an antenna having a natural period of oscillation coupled to said source to radiate said oscillations toward the earth and to absorb oscillations reflected from said earth, whereby said antenna constitutes a cyclically varying load on said source as the craft changes in altitude, and indicating means responsive to the intensity of oscillations produced by said source associated with said source.

13. The combination, in an altitude indicating device for aircraft, of an antenna arranged to radiate oscillations from the craft toward the earth and to receive said oscillations after reflection from the earth, an electron discharge device, a regenerative circuit for said electron discharge device, a coupling between said circuit and said antenna whereby the intensity of oscillations produced in said discharge device and regenerative circuit are in part determined by the current in said antenna, and indicating means responsive to the intensity of oscillations produced by said generator, for indicating the altitude of said aircraft.

14. In an altitude indicating device for aircraft, an electron discharge device having an anode circuit and a grid circuit, a regenerative coupling between said circuits, a radiating circuit coupled to one of said first mentioned circuits and arranged to radiate oscillations generated by said discharge device toward the earth and means responsive to current flowing in the anode of the discharge device for indicating the altitude of the craft.

15. The method of determining the altitude of an aeroplane above the earth's surface which includes the steps of, continuously radiating electric waves of radio frequency energy from a source on said aeroplane through space so that a substantial part of the wave energy impinges on the earth's surface and some of said waves are reflected back to said source and impressed on the waves therein, and producing indications characteristic of the reactions produced in said source by said impressed reflected waves.

16. The method of determining the proximity of the earth's surface to an aeroplane or the like which comprises, constantly radiating electric waves of radio frequency from a suitable source on said aeroplane, producing a flow of current by energy from said source, producing a second flow of current for balancing out said first flow of current from said source when the aeroplane is at such distance from the earth that the effects on said source of reflected wave energy are substantially zero, and determining the distance of the aeroplane from the earth by the intensity of the first mentioned current flow when said distance decreases to such magnitude that wave energy reflected back from the earth's surface reacts on said source.

17. The combination in an altitude indicating device for aircraft of an antenna for radiating oscillations from the aircraft towards a reflecting surface and picking up said oscillations after reflection from said surface, an electron discharge device having anode, cathode and control grid electrodes, coupled radio frequency circuits connected between said anode and cathode and between said control grid and cathode, a coupling between said circuits and said antenna. The intensity of the oscillations produced in said electron discharge device and said circuits being determined in part by the reflected energy in said antenna, a direct current circuit connected between said control grid and said cathode for determining the potential between said control grid and said cathode, and current intensity responsive means connected in said direct current circuit to indicate the distance of the aircraft from the reflecting surface.

18. The method of determining the altitude of aircraft above the earth which includes radiating a high frequency wave from the craft toward the earth, causing the wave which is reflected back from the earth to produce cyclic variations in the frequency of the radiated wave with respect to changes in altitude and utilizing the amount of said cyclic variations in frequency to determine the altitude.

19. The method of determining the altitude of aircraft above the earth which includes radiating a wave from the craft toward the earth having a wave length which is short compared with the altitude to be determined, causing said wave cyclically to vary in frequency dependently upon the phase relation existing between said radiated waves and waves reflected from the earth to the craft as the craft changes in altitude and observing the frequency of said waves.

20. The method of determining the altitude of an aircraft above the earth which includes transmitting a radio frequency wave from the craft, causing the frequency of said wave to vary cyclically dependently upon the phase relation existing between waves transmitted from the craft and waves which are deflected from the earth to the craft and changing the altitude of the craft sufficiently to observe a maximum of said cyclic variation.

21. The method of determining the altitude of aircraft above the earth which includes radiating a wave having a normal frequency from the craft, causing the frequency of said wave to vary from said normal frequency by maximum amounts recurring at regular intervals as the craft varies in altitude and utilizing the difference in amount of said recurring maxima to determine the altitude.

22. The method of determining the altitude of aircraft above the earth which includes radiating a wave having a normal frequency from the craft toward the earth, causing the frequency of said wave to vary from said normal value through recurring maxima as the craft varies in altitude and utilizing the frequency at points when said variations in frequency are approximately a maximum to determine the altitude.

23. The method of determining the altitude of aircraft above the earth which includes radiating a wave, having a normal frequency from the craft to the earth, causing the frequency of said wave to vary cyclically as the craft changes in altitude and observing successive maxima of said cyclic variation in frequency to determine the altitude.

24. The method of determining the proximity of a reflecting surface to an airplane which includes the steps of, producing on said airplane waves of alternating current energy of radio frequency, continuously radiating said waves of radio frequency toward said reflecting surface, from which said waves may be reflected to said airplane and impressed on said produced waves to cause changes in the frequency thereof, producing oscillations of a fixed frequency at said airplane, and beating said oscillations of fixed frequency with said alternating current energy of radio frequency to obtain beat notes the frequency of which may be observed.

FREDERICK H. DRAKE.